Patented June 16, 1931

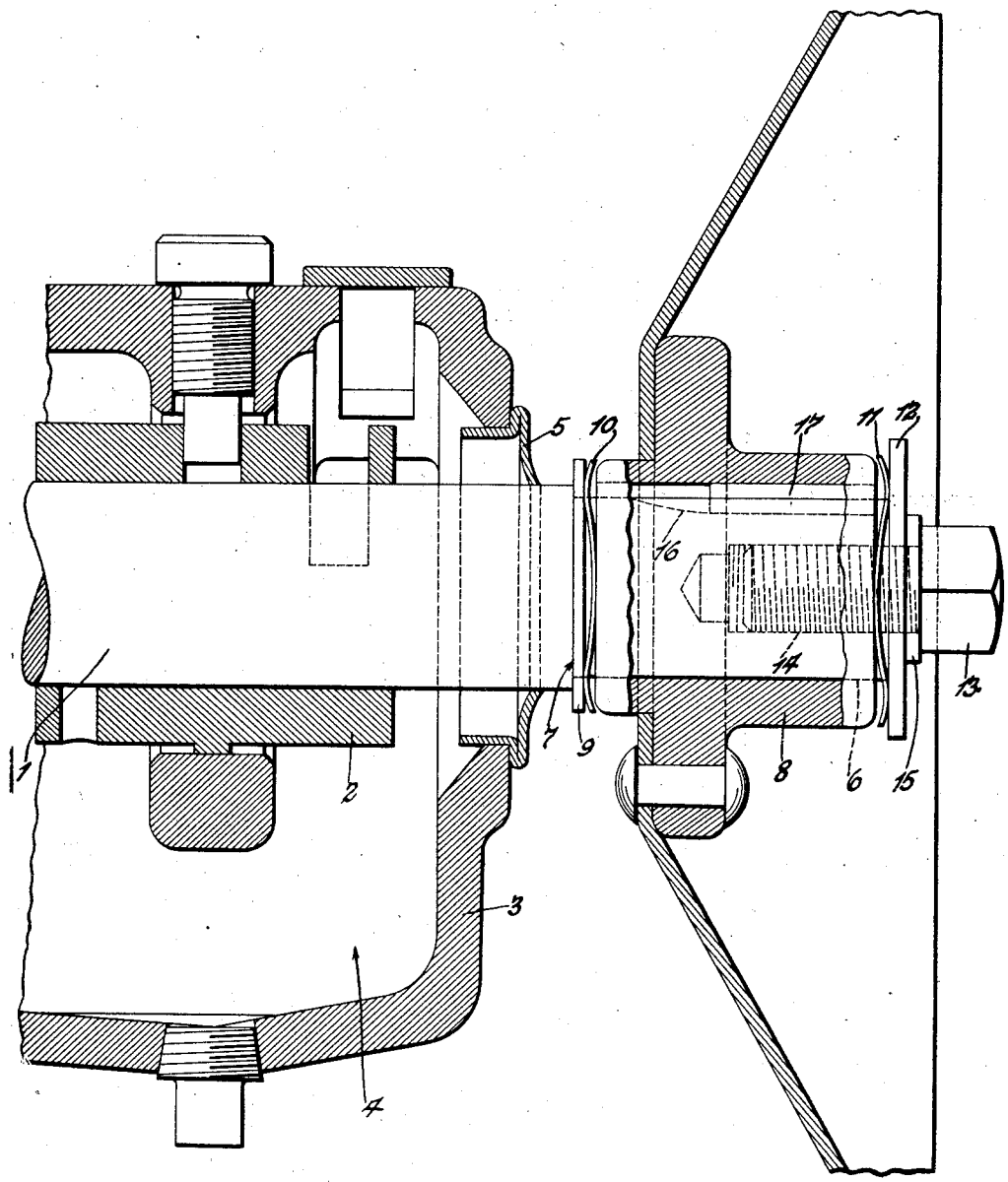

1,810,204

UNITED STATES PATENT OFFICE

ALBERT C. DICKSON, OF ST. LOUIS COUNTY, MISSOURI, ASSIGNOR TO THE EMERSON ELECTRIC MFG. CO., OF ST. LOUIS, MISSOURI, A CORPORATION OF MISSOURI

RESILIENT MOUNTING FOR DRIVEN ELEMENTS ON MOTOR SHAFTS

Application filed May 31, 1927. Serial No. 195,262.

This invention relates to improvements in resilient mountings for driven elements on motor shafts, and consists in the novel construction hereinafter disclosed.

It is known in the art that, where a driven element, such as a fan, is attached rigidly to the motor shaft by which it is directly driven, certain vibrations set up in the motor are transmitted to the driven element; and also, it is known, that vibrations occurring in the driven element are transmitted to the motor. This results in a noise when the device is in operation.

It is an object of the present invention to avoid this disadvantage in operation by providing a mounting for the driven element on the motor shaft which will be sufficiently resilient to absorb or dissipate the vibrations and which will be sufficiently rigid to provide positive rotation of the driven element, without distortion, even when driven at relatively high speed.

Another object of the invention is to provide a mounting for the driven element on the motor shaft which may be easily manipulated and in which there is provision for absorbing or dissipating the vibration, and at the same time preventing excess longitudinal movement of the driven element in respect of the shaft.

Additional advantages of the construction will be apparent from the following detailed description thereof taken in connection with the accompanying drawing, which is a vertical section of the mounting shown in association with the motor shaft.

In the embodiment of the invention illustrated in the drawing, a motor shaft 1, the outer portion of which is shown, is mounted in a bearing 2 supported within the motor housing 3 having a conventional oil reservoir 4 and lubricating connections for lubricating the shaft in the bearing. The shaft 1 extends outwardly from the motor housing 3 through an end piece 5. The projecting end of the shaft is reduced somewhat in diameter to form an extension 6, and to provide a shoulder 7 where the extension joins the main portion of the shaft.

A hub 8 of the driven element, such as a ventilating fan, is mounted over the reduced portion 6 of the shaft 1, said portion 6 extending through an axial opening in the hub 8. Between the rear face of the hub 8 and the shoulder 7 is interposed a loose washer 9 and a spring washer 10, the washer 9 being in the form of a flat ring, the inner face of which abuts against the shoulder 7. The washer 10 is of spring metal and is deflected to form a curved surface on both faces thereof, as clearly shown in the drawing.

The reduced portion 6 of the shaft 1 extends beyond the outer end of the hub and a spring washer 11, of the same construction as the washer 10, is mounted over the reduced portion 6 and bears against the end of the hub 8 of the driven member. A washer 12 is clamped against the end of the reduced portion 6 and impinges against the spring washer 11, forcing the spring washer into resilient contact with the end of the hub 8. The hub 8 of the driven element is therefore resiliently held longitudinally on the reduced portion 6 of the shaft 1.

The several parts comprising the mounting are held from displacement by a bolt 13 that threads into a threaded opening 14 in the end of the shaft 1 and, in order to insure adjustment of the parts, a lock washer 15 is interposed between the face of the washer 12 and the underface of the head of the bolt 13. Other means for holding the parts in adjustment may be employed, if desired.

The reduced portion 6 of the shaft 1 has a keyway 16 in its periphery and a key 17 is seated therein that serves to connect the hub 8 with the shaft. The connection may be accomplished by a rigid key, in which event slight play is allowed so that the hub may be said to be loosely keyed on the shaft. One alternative is to use a key of semi-resilient material, such as fiber or the like, thereby providing slight relative movement circumferentially between the hub of the driven element and the motor shaft. When the mounting is assembled, the resilient pressure at the opposite ends of the hub prevents any appreciable relative endwise movement of the hub on the shaft, but permits sufficient resiliency in the connection to prevent vibration transfer from the shaft to the driven element, or from the driven element to the shaft.

The foregoing construction prevents noise when the device is operated and, at the same time, provides a sufficiently rigid mounting to prevent distortion of the driven element on the shaft, even when operated at relatively high speed.

I am aware that the invention may be modified without departing from the spirit and scope of the invention, but what I claim and desire to secure by Letters Patent is:—

1. A device of the class described comprising, in combination, a shaft having a reduced portion; an element arranged to rotate with the shaft and having a hub fitting over said reduced portion; resilient attaching means between said hub and the shaft, including a washer loose on the shaft and a spring disc washer between the loose washer and the face of the hub; a key loosely fitted between the hub and the shaft; and means for holding the parts in assembled relation.

2. A device of the class described comprising, in combination, a shaft having a reduced portion; a driven element having a hub fitting over said reduced portion; resilient attaching means forming a loose connection between said hub and the shaft, including at each end of said hub a washer loose on the shaft and a spring disc washer between the loose washer and the face of the hub; a key loosely fitted between the hub and the shaft; and means for locking said connections to hold the hub on the shaft.

3. A device of the class described comprising, in combination, a motor shaft having a reduced portion; a driven element having a hub fitting over said reduced portion; resilient coupling means between said hub and the motor shaft, including a washer loose on the shaft and a spring disc washer between the loose washer and the face of the hub; a key of compressible material loosely fitted between the hub and the shaft; and locking means for locking the mounting including a bolt threaded into the end of the shaft and a lock washer beneath the head of said bolt.

4. A device of the class described comprising, in combination, a motor shaft having a reduced portion; a driven element having a hub fitting over said reduced portion; resilient means for holding said hub and the motor shaft in assembled adjustment, including at each end of said hub a washer loose on the shaft, and a spring washer between the loose washer and the face of the hub; a key extending longitudinally of the shaft for loosely connecting the hub and the shaft, and locking means for locking the mounting, including a bolt threaded into the end of the shaft, and a lock washer beneath the head of said bolt.

ALBERT C. DICKSON.